United States Patent
Silverman et al.

(10) Patent No.: US 12,218,703 B1
(45) Date of Patent: Feb. 4, 2025

(54) SYSTEMS AND METHODS TO DELEGATE OUT-OF-BAND MANAGEMENT OF A SHARED ULTRA-WIDEBAND CLOCK

(71) Applicant: Cisco Technology, Inc., San Jose, CA (US)

(72) Inventors: Matthew A. Silverman, Shaker Heights, OH (US); Robert C. Badea, Broadview Heights, OH (US); Jerome Henry, Pittsboro, NC (US); Robert E. Barton, Richmond (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 6 days.

(21) Appl. No.: 18/354,960

(22) Filed: Jul. 19, 2023

(51) Int. Cl.
*H04B 1/7183* (2011.01)
*H04W 64/00* (2009.01)
*H04W 76/10* (2018.01)

(52) U.S. Cl.
CPC .......... *H04B 1/7183* (2013.01); *H04W 64/00* (2013.01); *H04W 76/10* (2018.02)

(58) Field of Classification Search
CPC ..... H04B 1/7183; H04W 64/00; H04W 76/10
See application file for complete search history.

(56) References Cited

U.S. PATENT DOCUMENTS

| | | |
|---|---|---|
| 2021/0076367 A1 | 3/2021 | Bayesteh et al. |
| 2021/0136556 A1 | 5/2021 | Lee et al. |
| 2022/0385332 A1 | 12/2022 | Koo et al. |
| 2022/0386214 A1 | 12/2022 | Kim et al. |
| 2022/0397658 A1* | 12/2022 | Ha .......................... H04W 4/12 |
| 2023/0052581 A1 | 2/2023 | Corbalán Pelegrín et al. |
| 2023/0106567 A1 | 4/2023 | Barton et al. |
| 2023/0128414 A1* | 4/2023 | Seo ........................ H04L 5/0048 370/329 |
| 2023/0403671 A1* | 12/2023 | Reddy ............... H04W 72/1268 |

* cited by examiner

*Primary Examiner* — Vineeta S Panwalkar
(74) *Attorney, Agent, or Firm* — Baker Botts L.L.P.

(57) ABSTRACT

A system and a method to delegate out-of-band (OOB) management of a shared ultra-wideband (UWB) clock. The system may comprise a tagged device with a UWB tag and multiple anchors. The tagged device may be configured to establish at least one OOB communication link with at least one anchor, transmit UWB compatibility information to multiple anchors, establish a UWB communication links with the anchors, and exchange OOB synchronization parameters and UWB synchronization parameters with the anchors. Further, the tagged device may be configured to define new instructions for ranging round operations based at least in part upon the OOB synchronization parameters and the UWB synchronization parameters, update existing instructions with the new instructions in the ranging round operations, and perform the ranging round in accordance with the updated instructions.

20 Claims, 4 Drawing Sheets

SYSTEMS AND METHODS TO DELEGATE OUT-OF-BAND MANAGEMENT OF A SHARED ULTRA-WIDEBAND CLOCK

TECHNICAL FIELD

The present disclosure relates generally to a field of information synchronization and more particularly, to a system and a method to delegate out-of-band (OOB) management of a shared ultra-wideband (UWB) clock.

BACKGROUND

Internet-of-Thing (IoT) devices use several processing and memory resources during localization operations. In cases where a specific IoT device is newly integrated in a space, this device may attempt to determine its location in the space by connecting to one or more existing IoT devices in the space. In these cases, localization operations of the specific IoT device are heavily limited by scalability and range capabilities of the existing IoT devices.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
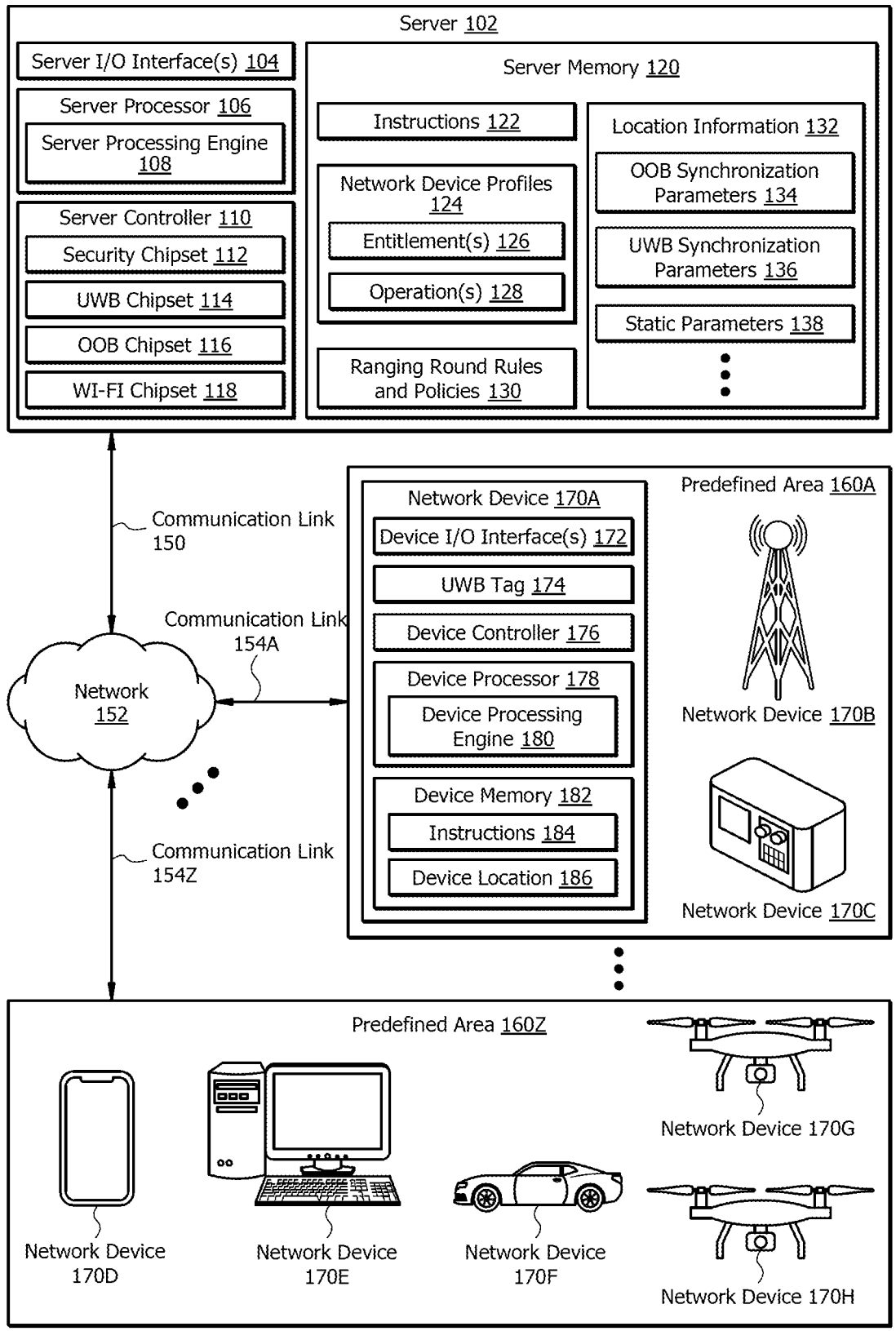
FIG. 1 illustrates an example system, according to some embodiments of the present disclosure.

In one or more embodiments, a system and a method described herein delegate out-of-band (OOB) management of a shared ultra-wideband (UWB) clock during synchronization operations. The system and the method are configured to enable network devices comprising OOB communication capabilities and UWB communication capabilities to exchange OOB synchronization parameters and UWB synchronization parameters simultaneously during a synchronization period. In some embodiments, the system and the method are configured to enable the network devices to maintain a shared UWB clock by performing certain synchronization operations using OOB channels in addition to UWB channels. For example, a network device transitioning into a new space may establish an OOB communication link and a UWB communication link to perform the synchronization operations with multiple network devices acting as anchors. These network devices may operate as access points (APs), initiator anchors, or responder anchors. In one or more embodiments, any network device operating as a tagged device in one or more predefined areas may maintain the shared clock in the UWB communication link while offloading multiple operational communications to the OOB communication link.

In one or more embodiments, the tagged device may transition from a previous location to one of the predefined areas by booting up in the predefined areas for the first time of by moving from a first predefined area to a second predefined area. In some embodiments, the tagged device may use the OOB synchronization parameters and the UWB synchronization parameters in Time Difference Of Arrival (TDOA) operations to determine its relative or absolute location in the predefined areas. In other embodiments, the tagged device determines its location in a three-dimensional (3D) space such that coordinates may be determined for the tagged device comprising x-axis coordinates, y-axis coordinates, and z-axis coordinates. The location in the 3D space may be specific to a centimeter-level (e.g., to a less-than-one centimeter margin of error).

In accordance with one or more embodiments, a system or an apparatus, such as a network device acting as a tagged device transitioning into a predefined area, includes a first UWB tag communicatively coupled with a first processor. The system may delegate OOB management of a shared UWB clock. The first processor may be configured to receive OOB communication information from a first anchor of multiple anchors, request to establish a first OOB communication link with the first anchor based at least in part upon the OOB communication information, and establish the first OOB communication link with the first anchor. Further, the first processor may be configured to exchange multiple OOB synchronization parameters with the first anchor in response to establishing the first OOB communication link, and transmit first UWB compatibility information to the first anchor. The first UWB compatibility information is representative of first communication capabilities associated with the first UWB tag. The first processor may be configured to establish a first UWB communication link with the first anchor based at least in part upon the first UWB compatibility information, establish a second UWB communication link with a second anchor of the multiple anchors based at least in part upon the first UWB compatibility information, exchange first UWB synchronization parameters with the first anchor and the second anchor, and determine a first location of the first tagged device in a space based at least in part upon the first UWB synchronization parameters exchanged with the first anchor and the second anchor.

In some cases, the system may further comprise a second tagged device comprising a second UWB tag communicatively coupled with a second processor. The second processor may be configured to receive the OOB communication information from the first anchor, request to establish a second OOB communication link with the first anchor based at least in part upon the OOB communication information, establish the second OOB communication link with the first anchor, exchange the OOB synchronization parameters with the first anchor in response to establishing the second OOB communication link, and transmit second UWB compatibility information to the first anchor. The second UWB compatibility information may be representative of second communication capabilities associated with the second UWB tag. The second processor may be further configured to establish a third UWB communication link with the first anchor based at least in part upon the second UWB compatibility information, establish a fourth UWB communication link with the second anchor based at least in part upon the second UWB compatibility information, exchange second UWB synchronization parameters with the first anchor and the second anchor, and determine a second location of the second tagged device in the space based at least in part upon the second UWB synchronization parameters exchanged with the first anchor and the second anchor.

In certain cases, the OOB synchronization parameters include timing of nodes in a synchronization group, rounding initiation, rounding updates, rounding end, anchor locations in the synchronization group, and a list of nearby anchors.

In some cases, the first UWB synchronization parameters include one or more first location measurements associated with the first tagged device and the second UWB synchronization parameters include one or more second location measurements associated with the second tagged device.

In yet other cases, exchanging the first UWB synchronization parameters with the first anchor and the second anchor includes performing a ranging round.

In some cases, the first tagged device is a Machine Type Communication (MTC) device. In other embodiments, the first UWB synchronization parameters include key configuration parameters and static configuration parameters that are maintained during a synchronization period.

In accordance with other embodiments, a method performed by a tagged device comprising an UWB tag comprises receiving out-of-band OOB communication information from a first anchor of multiple anchors, requesting to establish an OOB communication link with the first anchor based at least in part upon the OOB communication information, establishing the OOB communication link with the first anchor, exchanging multiple OOB synchronization parameters with the first anchor in response to establishing the OOB communication link, and transmitting UWB compatibility information to the first anchor. The UWB compatibility information may be representative of communication capabilities associated with the UWB tag. Further, the method comprises establishing a first UWB communication link with the first anchor based at least in part upon the UWB compatibility information, establishing a second UWB communication link with a second anchor of the multiple anchors based at least in part upon the UWB compatibility information, exchanging multiple UWB synchronization parameters with the first anchor and the second anchor, and determining a first location of the tagged device in a space based at least in part upon the multiple UWB synchronization parameters exchanged with the first anchor and the second anchor.

In accordance with yet other embodiments, a non-transitory computer readable medium in a tagged device storing instructions that when executed by a processor cause the processor to delegate OOB management of a shared UWB clock. The instructions may further cause the processor to receive OOB communication information from a first anchor of multiple anchors, request to establish an OOB communication link with the first anchor based at least in part upon the OOB communication information, establish the OOB communication link with the first anchor, exchange multiple OOB synchronization parameters with the first anchor in response to establishing the OOB communication link, and transmit UWB compatibility information to the first anchor. The UWB compatibility may be representative of communication capabilities associated with a UWB tag of the tagged device. The instructions may cause the processor to establish a first UWB communication link with the first anchor based at least in part upon the UWB compatibility information, establish a second UWB communication link with a second anchor of the anchors based at least in part upon the UWB compatibility information, exchange multiple UWB synchronization parameters with the first anchor and the second anchor, and determine a location of the tagged device in a space based at least in part upon the UWB synchronization parameters exchanged with the first anchor and the second anchor.

Technical advantages of certain embodiments of this disclosure may include one or more of the following. The system and the method described herein provide the technical solution of performing out-of-band configuration of a UWB time synchronization exchange between network devices to achieve double-digit picosecond level synchronization of clocks, while maintaining the best possible communication range in a space (e.g., one or more predefined areas). Specifically, the system and the method are configured to offload synchronization operations from UWB channels to OOB channels. As a result, synchronization operations occupy less UWB bandwidth during each synchronization period. For example, a system of network devices coordinating synchronization operations using OOB channels and UWB channels as described herein may save over 50 bytes of data per synchronization period or ranging operation.

In addition, the system and the method described herein are integrated into practical applications of optimizing processor usage and improving power consumption in the system. Specifically, the system and the method optimize processor usage by increasing a synchronization range of the network devices while maintaining previous processing speeds. Further, the system and the method may optimize power consumption by increasing an amount of data or by increasing a communication range during communication operations.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
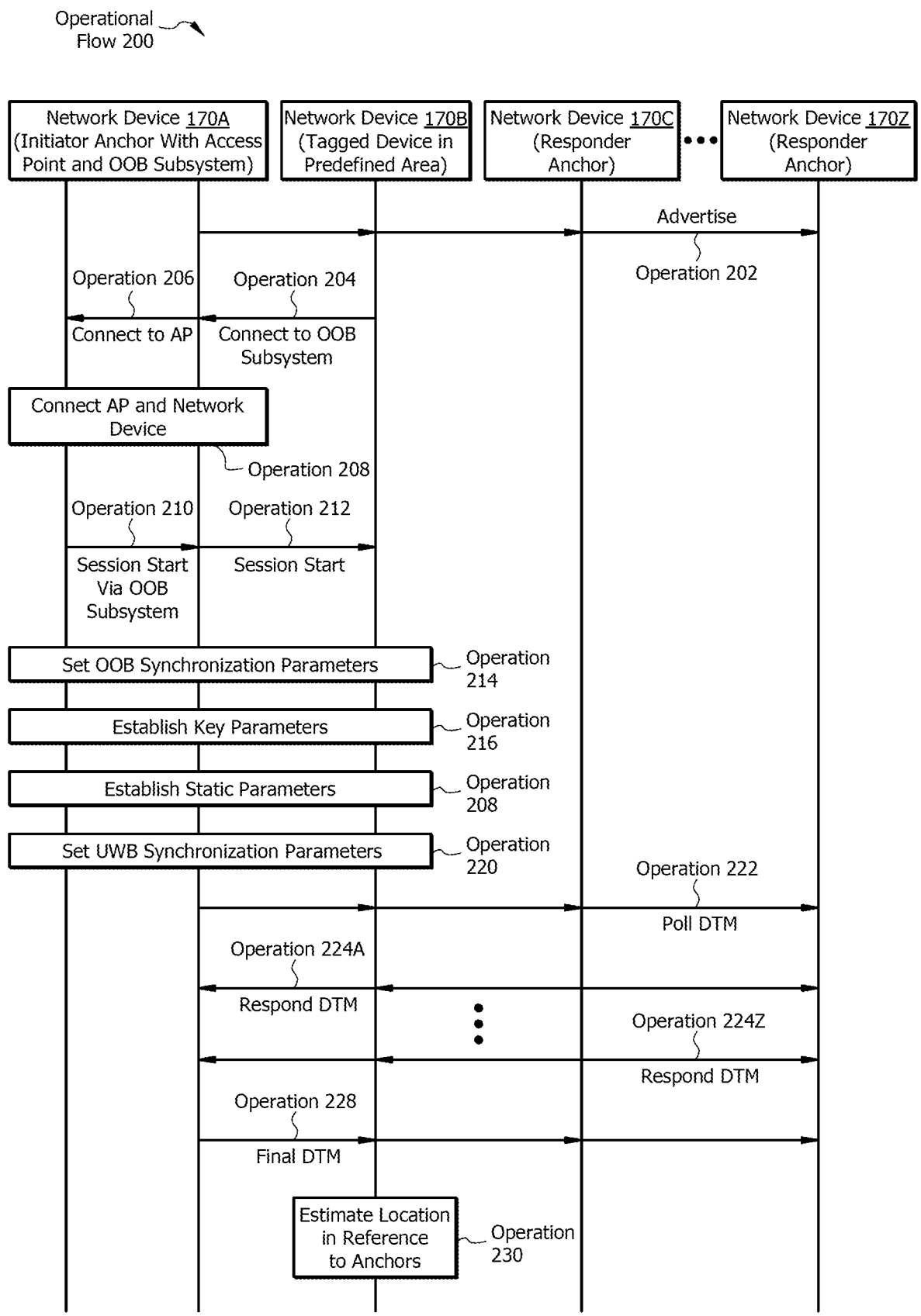
FIG. 2 illustrates an operational flow of the system of FIG. 1, according to some embodiments of the present disclosure.
Figure 3:
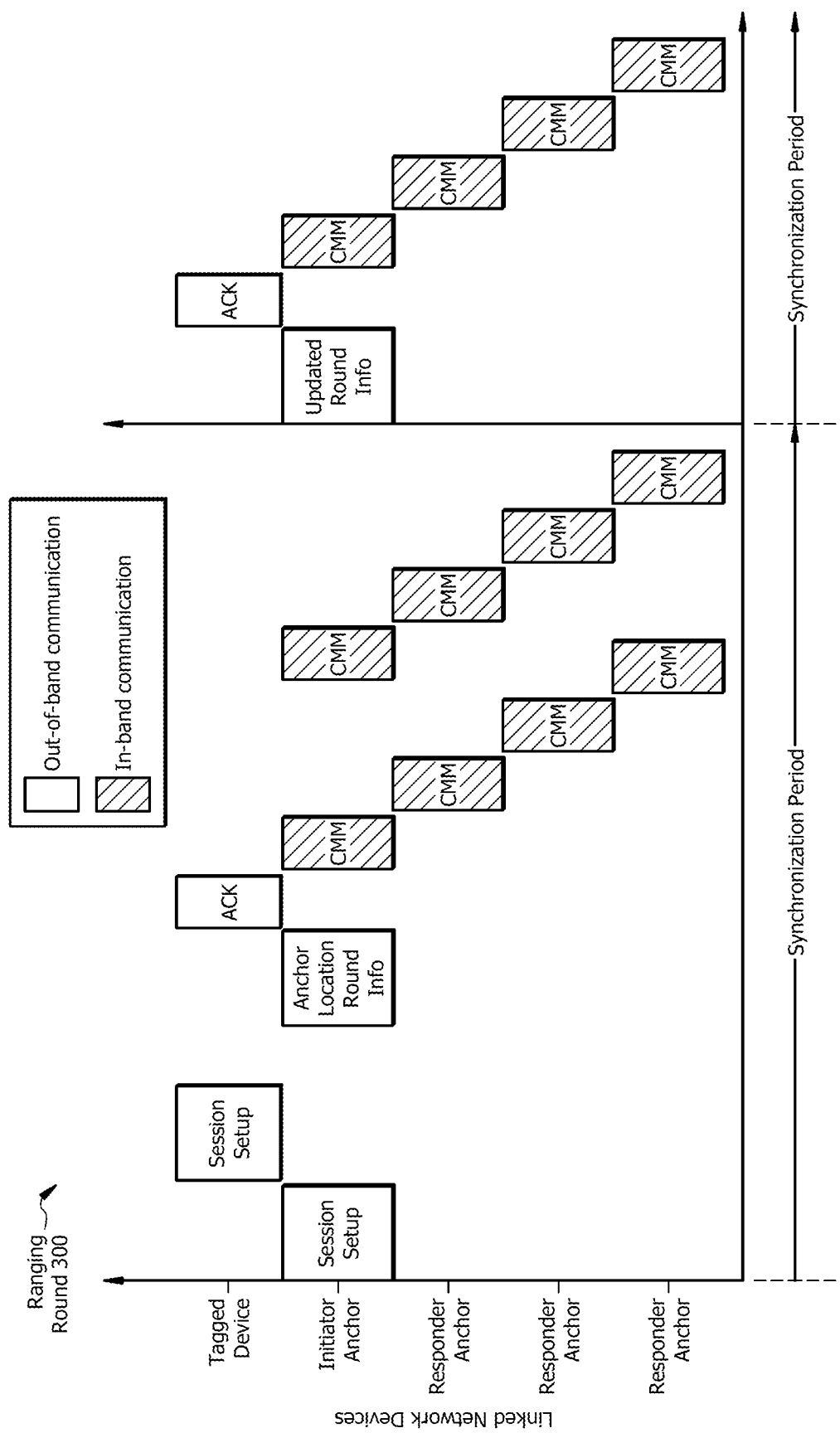
FIG. 3 illustrates an example graph representative of at least a portion of the operational flow of FIG. 2, according to some embodiments of the present disclosure.
Figure 4:
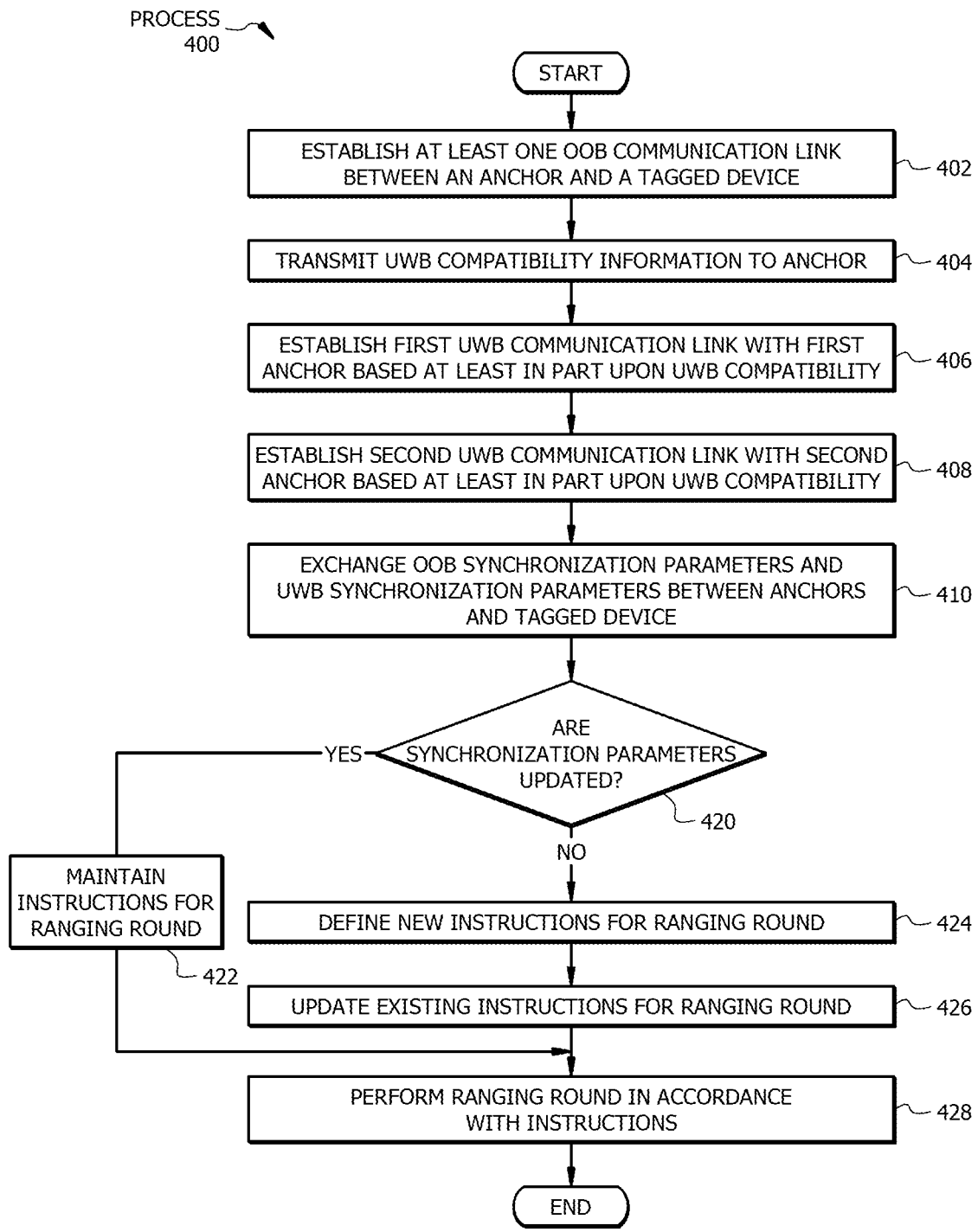
FIG. 4 illustrates an example process for performing the operational flow of FIG. 2, according to some embodiments of the present disclosure.

This disclosure describes systems and methods to delegate OOB management of a shared UWB clock during synchronization operations. In particular, this disclosure provides various systems and methods to exchange synchronization parameters using OOB communication links and UWB communication links simultaneously. FIG. 1 illustrates a system 100 in which one or more network devices 170A-170H exchange synchronization parameters in one or more predefined areas 160A-160Z. FIG. 2 illustrates an operational flow 200 in which a network devices 170A-170Z of the system 100 of FIG. 1 are configured to offload synchronization parameters to OOB channels. FIG. 3 illustrates a graph of a ranging round 300 representative of one or more operations in the operational flow 200 of FIG. 2. FIG. 4 illustrates a process 400 to perform the operational flow 200 of FIG. 2.

FIG. 1 illustrates a system 100 configured to delegate OOB management of a shared UWB clock during synchronization operations. The system 100 comprises a server 102 and multiple network devices 170A-170H (collectively, network devices 170) located in one or more predefined areas 160A-160Z (collectively, predefined areas 160) communicably coupled to one another directly or indirectly via the network 152. In FIG. 1, the server is connected to the network 152 via a communication link 150, the network devices 170A-170C in the predefined area 160A are connected to the network 152 via a communication link 154A, and the network devices 170D-170H in the predefined area 160Z are connected to the network 152 via a communication link 154Z. The predefined area 160A and the predefined area 160Z are representative of multiple possible predefined areas 160 in a space. The predefined areas 160 may be warehouses, assembly facilities. The communication link 154A and the communication link 154Z are representative of multiple possible communication links 154. The predefined areas 160 may comprise multiple distinct or separate sub-areas. In some embodiments, the server 102 may be configured to provision any anchored network devices 170 in the predefined areas 160 to exchange OOB synchronization parameters and UWB synchronization parameters with new tagged devices transitioning into a space in the predefined areas 160. The communication link 150 and the communication links 154A-154Z may be wired or wireless connections configured to enable communication between the network devices 170, the network 152, and the server 102. In other embodiments, the network 152 and the server 102 may be partially or completely located in the predefined areas 160 among the network devices 170.

In one or more embodiments, one or more of the network devices 170 may be configured to provision one another or new tagged devices in accordance with the standards established by the fine ranging (FiRa) consortium. The server 102 and the network devices 170 may operate one or more hardware layers and application layers. The hardware layers operated by the server 102 and the network devices 170 may comprise one or more secure components, at least one OOB subsystem, and one or more UWB systems. The software layers operated by the server 102 and the network devices 170 may comprise one or more FiRa enabled applications, one or more secure services, a FiRa profile manager, a UWB service, one or more FiRa OOB connectors, and one or more OOB services.

In one or more embodiments, as a non-limiting example, the network devices 170 may be associated with one or more users (not shown). There may be multiple users or no users associated with the network devices 170. In some embodiments, the network devices 170 may be unassociated with any users and perform one or more roles completely autonomously from ongoing (e.g., constant) human management or intervention. For example, the network devices 170 may be Internet-of-Things (IoT) devices or Machine Type Communication (MTC) devices comprising multiple industrial components autonomously assembling motor vehicles in a warehouse, multiple unmanned aerial systems (UASs) or unmanned aerial vehicles (UAVs) flying over a stadium performing a light show, or multiple household devices configured to communicate with one another while performing one or more household tasks. In some embodiments, some of the network devices 170 may be part of a sub-group of network devices. In an example, the network device 120B and the network device 120C may be associated to one another as communication nodes (e.g., routers or base stations) performing similar tasks such as routing connectivity signals in the predefined area 160A. In another example, the network device 170G and the network device 120H may be associated to one another as UAVs performing similar tasks such as aerial sensing and diagnosis in the predefined area 160Z.

In the example of FIG. 1, the predefined area 160A is shown comprising a network device 170A, a network device 170B, and a network device 170C. Further, the predefined area 160Z is shown comprising a network device 170D, a network device 170E, a network device 170F, a network device 170F, and a network device 170H. In one example, the predefined areas 160 include a house. In this example, the predefined area 160A may be a living room of the house, a predefined area 160B (implicitly references in the three dots between the predefined area 160A and the predefined area 160Z) may be a bedroom of the house, and a predefined area 160C (implicitly references in the three dots between the predefined area 160A and the predefined area 160Z) may be a garage of the house. In another example, the predefined areas 160 comprise a space or an area above a building. In this example, the network devices 170 may be UASs configured to move around the space.

In other embodiments, the server 102 may take any suitable physical form. As example and not by way of limitation, the server 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a router device, or a combination of two or more of these. Where appropriate, the server 102 may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, the server 102 may perform in real-time or in batch mode one or more steps of one or more methods described or illustrated herein. The server 102 may perform at different times or at different locations one or more steps of one or more methods described or illustrated herein, where appropriate.

In one or more embodiments, the server 102 may comprise one or more server input (I)/output (O) interfaces 104, one or more server processors 106, a server controller 110, and a server memory 120. The server I/O interfaces 104 may comprise hardware, software executed by software, or a combination of both, providing one or more interfaces for communication between the server 102 and one or more I/O devices. The server 102 may include one or more of these I/O devices, where appropriate. One or more of these I/O devices may enable communication between a person and the server 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable server I/O interfaces 104 for them. Where appropriate, the server I/O interfaces 104 may include one or more device or software drivers enabling the one or more server processors 106 to drive one or more of these I/O devices. Although this disclosure describes and illustrates particular server I/O interfaces 104, this disclosure contemplates any suitable number of server I/O interfaces 104.

In one or more embodiments, the server I/O interfaces 104 may comprise a communication interface including hardware, software executed by hardware, or a combination of both providing one or more interfaces for communication (such as, for example, packet-based communication) between the server 102, the one or more network devices 170, the network 152, or one or more additional networks. As an example, and not by way of limitation, the communication interface of the server I/O interfaces 104 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the server 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network devices 170 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The server 102 may include any suitable communication interface for any of these networks, where appropriate. Although this disclosure describes and illustrates the server I/O interfaces 104 comprising particular communication interfaces, this disclosure contemplates any suitable communication interface.

In some embodiments, the server I/O interfaces 104 may comprise storage and databases communicatively coupled to the one or more server processors 106, the server I/O interfaces 104, and the server memory 120. The storage and databases may comprise wired connections that share an internal bandwidth for data packet transmissions inside the server 102 with the server memory 120. The storage and databases may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may comprise instructions and data memory for the one or more server processors 106.

In particular embodiments, the server I/O interfaces 104 may comprise a transceiver (e.g., transmitter, receiver, or a combination of both) configured to implement one or more wireless or wired connectivity protocols. In this regard, the transceiver may comprise antennas comprising hardware configured to establish one or more communication links (e.g., the communication link 150 and the communication links 154) between the server 102 and one or more of the network devices 170. Although this disclosure describes and illustrates the communication link 150 and the communication links 154, this disclosure contemplates any arrangement of channels for information exchange.

In other embodiments, the server I/O interfaces 104 may comprise an interconnect including hardware configured to connect the one or more server processors 106, the server controller 110, and the server memory 120. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

In some embodiments, the one or more server processors 106 comprise hardware for executing instructions (e.g., instructions 122), such as those making up a computer program. As an example, and not by way of limitation, to execute instructions, the one or more server processors 106 may retrieve (or fetch) the instructions from an internal register, an internal cache, or the server memory 120; decode and execute them; and then write one or more results to an internal register, an internal cache, or the server memory 120. Specifically, the one or more server processors 106 may include one or more internal caches for data, instructions, or addresses. This disclosure contemplates the one or more server processors 106 including any suitable number of internal caches, where appropriate. As an example, and not by way of limitation, the one or more server processors 106 may include one or more instruction caches, one or more data caches, and one or more translation lookaside buffers (TLBs). Instructions in the instruction caches may be copies of instructions 122 in the server memory 120, and the instruction caches may speed up retrieval of those instructions by the one or more server processors 106. Data in the data caches may be copies of data in the server memory 120 for instructions executing at the one or more server processors 106 to operate on via one or more processing engine 108; the results of previous instructions executed at the one or more server processors 106 for access by subsequent instructions executing at the one or more server processors 106 or for writing to the server memory 120, or other suitable data. The data caches may speed up read or write operations by the one or more server processors 106. The TLBs may speed up virtual-address translation for the one or more server processors 106. In particular embodiments, the one or more server processors 106 may include one or more internal registers for data, instructions, or addresses. This disclosure contemplates the one or more server processors 106 including any suitable number of suitable internal registers, where appropriate. Where appropriate, the one or more server processors 106 may include one or more arithmetic logic units (ALUs); be a multi-core processor; or include one or more additional one or more server processors 106. Although this disclosure describes and illustrates a particular processor, this disclosure contemplates any suitable processor.

In one or more embodiments, the one or more server processors 106 include hardware, software executed by hardware, or a combination of both, configured to reprovision the network devices 170 to perform one or more tasks in the predefined areas 160. In some embodiments, the one or more server processors 106 are configured to determine a location of a specific network device 170 within a specific predefined area 160. The one or more server processors 106 may be a routing devices configured to route resources in the network 152 to additional network devices 170. In some embodiments, the one or more server processors 106 may be included on a same card or die. In this regard, the one or more server processors 106 may be configured to determine a 3D posture of the network devices 170. The 3D posture may comprise positions, direction, movement, speed, and short-term movement plans in an X-axis, a Y-axis, and a Z-axis.

In other embodiments, the processing engine 108 may be software executed by hardware and configured to dynamically aid the network devices 170 to maintain synchronization parameters during synchronization operations. The processing engine 108 may be implemented by the one or more server processors 106 operating as specialized hardware accelerators. The processing engine 108 may be configured to implement networking-specific processing tasks in custom logic and achieve better performance than typical software implementations. For example, the processing engine 108 may be lookup engines (e.g., using specialized logic), cryptographic coprocessors, content inspection engines, and the like. In some embodiments, the one or more processing engines configured to operate the server controller 110 via execution of one or more of the instructions 122.

In one or more embodiments, the server controller 110 is hardware, software executed by hardware, or a combination of both configured to maintain OOB synchronization parameters and UWB synchronization parameters among the network devices 170. In some embodiments, the server 102 may determine the 3D posture of the network devices 170. In some embodiments, the server 102 may be configured to schedule timings for transmissions of multiple network devices 170 acting as anchors of scheduling instructions. The server controller 110 may comprise a security chipset 112 configured to establish one or more physical gates/firewalls at the server 102 or at one or more of the network devices 170, a UWB chipset 114 configured to provide UWB connectivity capabilities, an OOB chipset 116 configured to provide OOB connectivity capabilities, and a WI-FI chipset 118 configured to provide WI-FI connectivity capabilities. In other embodiments, the OOB chipset 116 and the WI-FI chipset 118 may be combined into a same chipset (e.g., the WI-FI chipset 118 may perform OOB communication exchanges).

In one or more embodiments, the server memory 120 includes mass storage for data or instructions. As an example, and not by way of limitation, the server memory 120 may include a hard disk drive (HDD), a floppy disk drive, flash memory, an optical disc, a magneto-optical disc, magnetic tape, or a Universal Serial Bus (USB) drive or a combination of two or more of these. The server memory 120 may include removable or non-removable (or fixed) media, where appropriate. The server memory 120 may be internal or external to a computer system, where appropriate. In particular embodiments, the server memory 120 is non-volatile, solid-state memory. In particular embodiments, the server memory 120 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the server memory 120 as a mass storage taking any suitable physical form. The server memory 120 may include one or more storage control units facilitating communication between the one or more server processors 106 and the server memory 120, where appropriate. Although this disclosure describes and illustrates particular storage, this disclosure contemplates any suitable storage.

In one or more embodiments, the server memory 120 includes a main memory for storing the instructions 122 for the one or more server processors 106 to execute or data for the one or more server processors 106 to operate on. As an example, and not by way of limitation, the network devices 170 may load the instructions 122 from another memory in the network devices 170. The one or more server processors 106 may then load the instructions 122 from the server memory 120 to an internal register or internal cache. To execute the instructions 122, the one or more server processors 106 may retrieve the instructions 122 from the internal register or internal cache and decode them. During or after execution of the instructions 122, the one or more server processors 106 may write one or more results (which may be intermediate or final results) to the internal register or internal cache. The one or more server processors 106 may then write one or more of those results to the server memory 120. In some embodiments, the one or more server processors 106 executes only the instructions 122 in one or more internal registers or internal caches or in the server memory 120 and operates only on data in one or more internal registers or internal caches or in the server memory 120.

In one or more embodiments, the server memory 120 includes commands or data associated with one or more specific applications in addition or as part of the instructions 122. In FIG. 1, the server memory 120 comprises one or more network device profiles 124, multiple ranging round rules and policies 130, and location information 132. The one or more network device profiles 124 may comprise one or more entitlements 126 and one or more operations 128. The one or more network device profiles 124 may be configured to provide access to configuration parameters for the network devices 170 to operate (e.g., perform one or more tasks) in the predefined areas 160. The entitlements 126 may be configured to provide one or more connectivity allowances to the network devices 170 in the predefined areas 160. For example, the network device 170B may be a base station tower or an antenna configured to route signaling among some of the additional network devices 170. In this regard, the entitlements 126 associated with a network device profile 124 of the network device 170B may indicate that the network device 170B is allowed to communicate with one or more components in the network 152 (e.g., core network components or servers comprising specific network functions (NF)). In some embodiments, the ranging round rules and policies 130 may be procedure or operational guidelines predefined by one or more organizations associated with the server 102. In other embodiments, the location information 132 may comprise the OOB synchronization parameters 134, the UWB synchronization parameters 136, multiple static parameters 138, and one or more additional localization parameters.

In one or more embodiments, the location information 132 may be a data repository configured to indicate synchronization parameters and operational parameters to the network devices 170. In some embodiments, the server 102 may use the location information 132 to configure the network devices 170 to transmit up to −41.3 decibel milli-Watt (dBm) of energy per 1 millisecond (ms) period. In some embodiments, if the transmission is to last an entirety of the 1 ms period, then the total amount of energy measured at the antenna would be −41.3 dBm. The dBm is a signal strength or power level. In this context, 0 dBm is defined as 1 mW (milliWatt) of power into a terminating load such as an antenna or power meter. In other embodiments, the network devices 170 may be configured by the location information 132 to perform synchronization procedures during a wireless synchronization frame (e.g., a synchronization period) of a duration less than a 1 ms averaging period (e.g., 200 microseconds (μs) or less in some instances). The power used in excess to implement the synchronization of the network devices 170 during the synchronization period is known as gating gain and it is represented by Equation (1) below.

$$\text{gain}_{gating} = 10\log\left(\frac{1000}{T_{frame}}\right) \quad \text{Equation (1)}$$

In Equation (1), the Tframe is the length of the wireless synchronization frame in microseconds. In some embodiments, the longer the frame of the message or payload being delivered, the less average power which may be placed into an individual message, thus lowering any communication link budget and range of any localization infrastructure implementing the location information 132. To take advantage of the gating gain, the UWB synchronization parameters 136 may be exchanged UWB in-band transmissions that may be part of actual synchronization or location communication exchanges among the network devices 170. In this regard, set up operations (e.g., comprising key configuration parameters or the static parameters 138) may be pushed to OOB transmissions as part of the OOB synchronization parameters 134. In this regard, the server controller 110, may configured the UWB chipset 114, the OOB chipset 116, and the WI-FI chipset 118 to coordinate simultaneous OOB synchronization and UWB synchronization. For example, the network device 170C may be a WI-FI access point that already incorporates WI-FI technologies and Bluetooth™ Low Energy technologies to enable localization procedures of additional network devices 170. In this example, the network device 170 may be modified to comprise a UWB tag 174 providing the same capabilities of the UWB chipset 114 and enabling the simultaneous exchange of the OOB synchronization parameters 134 and the UWB synchronization parameters 136.

During the synchronization periods, the network devices 170 may comprise session description frames with information distributed across the OOB synchronization parameters 134 and the UWB synchronization parameters 136. The session description frames may comprise a poll DTM comprising one or more mandatory fields, message control, round index, block index, transmission timestamp, one or more optional fields, responder Downlink TDOA (DT)-anchor management lists, hopping count, one or more anchor locations, and active ranging round information. The poll DT Message (DTM) may be a first message sent by one of the network devices 170 operating as an initiator anchor within one or more additional network devices 170 which marks a beginning of a round of synchronization exchanges. A variable media access control (MAC) portion in a payload of the session description frames contains information to support multilateration by solving a system of hyperbolic equations. Multilateration, also known as hyperbolic positioning, is the process of locating an object by accurately computing the TDOA of a signal emitted from one network device to others. The session description frames may comprise one or more response DTMs comprising one or more mandatory fields, message control, round index, block index, transmission timestamp, responder reply time delay, one or more optional fields, responder Carrier Frequency Offset (CFO), responder Time of Flight (TOF) result, anchor location, and active ranging round information. The response DTM may be synchronization messages returned by network devices 170 responding in corresponding assigned slots within a ranging round (e.g., in a synchronization period). These messages may contain any corrected timestamps within the initiator's frame of reference allowing a tagged device to accurately calculate the TDOA between the poll DTM and a given response DTM.

In some embodiments, the term "round" corresponds to a single set of wireless synchronization exchanges between an initiator anchor and any assigned responder anchors. The beginning of the round is marked by a first poll DTM transmitted by the initiator anchor to constituent responder anchors. The responder anchors may return a single response synchronization messages at corresponding assigned time slots within the round. This synchronization exchange for a cluster of responder anchors within the round is illustrated in FIG. 2. In this regard, the index corresponds to a location of a particular round within a ranging block. The block index may comprise several rounds of exchanges in which unique clusters of the network devices 170 exchange wireless synchronization messages. A cluster may comprise a single initiator and at least two responder anchors. The rounds may be spaced apart in time sequentially to avoid collision between adjacent clusters.

In one or more embodiments, the OOB synchronization parameters 134 may comprise round information, block information, timing/schedule of nodes in sync group and corresponding MAC addresses including repetition of schedule, round/block initiation indicator, round/block updates, round/block end indicator, one or more anchor locations, 3D location of each anchor in a given synchronization group, nearby anchor lists, one or more lists of nearby/neighboring synchronization groups, corresponding identifiers (IDs) and initiator nodes, UWB MAC addresses, device location format information, device location information, codes if there are different security token service (STS) codes used across clusters, session ID; session length (e.g., a number of blocks), number of rounds per block, slot duration in μs, round indexes, and device roles. In some embodiments, the OOB synchronization parameters 134 may comprise one or more of the listed elements.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 152 may be a combination of electronic devices forming a multi-node mesh. As an example and not by way of limitation, one or more portions of the network 152 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 152, or a combination of two or more such networks.

In one or more embodiments, any one of the predefined areas 160 may comprise thousands of network devices 170 implementing downlink (DL) TDOA protocols with anchors comprising known positions to determine their own location. Referring to the network device 170A as a non-limiting example, the network devices 170 may comprise one or more device I/O interfaces 172, a UWB tag 174, a device controller 176 comprising UWB compatibility information, a device processor 178 comprising a device processing engine 180, and a device memory 182 comprising one or more instructions 184 and a device location 186. In one or more embodiments, the one or more network devices 170 include end-user devices such as laptops, phones, tablets, and any other suitable device that are capable of receiving, creating, processing, storing, or communicating information, including data packet transmissions. In some embodiments, the network devices 170 represents client devices or user devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), car devices, and the like), and so forth. The network devices 170 may also include IoT devices or equipment, such as agricultural equipment (e.g., livestock tracking and management systems, watering devices, UAVs, and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

In one or more embodiments, the device I/O interfaces 172 may be configured to perform one or more of the operations described in reference to the server I/O interfaces 172, the device processor 178 may be configured to perform one or more of the operations described in reference to the one or more server processors 106, the device processing engine 180 may be configured to perform one or more of the operations described in reference to the server processing engine 108, and the device memory 182 may be configured to perform one or more of the operations described in reference to the server memory 120. In some embodiments, the instructions 184 may be used to perform one or more of the operations described in reference to the instructions 122. The device location 186 may be information indicating a current 3D position of the network device 170A in the predefined area 160A. In some embodiments, the device controller 176 may be perform one or more of the operations described in reference to the server controller 110. In this regard, the UWB compatibility information may be representative of communication capabilities associated with the UWB tag 174 provided by the various chipsets.

FIG. 2 shows an example of the operational flow 200, in accordance with one or more embodiments. In FIG. 2, the operational flow 200 comprises operations 202-230 are performed by the network device 170A, the network device 170B, the network device 170C, and one or more network devices 170 (e.g., represented by the network device 170Z). In FIG. 2, the operational flow 200 is performed by different components in the system 100. In particular, the operational flow 200 may be performed by the server 102 and one or more of the network devices 170 in the predefined areas 160 (e.g., represented by the range from the predefined area 160A to the predefined area 160Z). As a non-limiting example, the network device 170A is operated an initiator anchor comprising an access point and an OOB subsystem, the network device 170B is a tagged device in the predefined area, and one or more additional network devices 170 operating as responder anchors (e.g., represented by the range from the network device 170C to a network device 170Z).

In the operational flow 200 of FIG. 2, the network device 120B is introduced to one or more predefined areas 160 comprising the other network devices 170. At operation 202, the network device 170A advertises OOB communication information in one or more broadcaster signals to any additional network devices 170. At operation 204, the network device 170B requests to connect to the OOB subsystem of the network device 170A. In turn, at operation 206, the network device 170A connects the request to its AP. At operation 208, the network device 120A connects the AP and the network devices 170. At operation 210, the AP starts a ranging session via the OOB system. At operation 212, the session may start with the network device 170B.

The operational flow 200 continues at operation 214, where the network device 170A and the network device 170B set the OOB synchronization parameters 134. At operation 216, the network device 170A and the network device 170B establish key parameters to perform the ranging rounds. At operation 218, the network device 170A and the network device 120B establish static parameters for the ranging rounds. At operation 220, the network device 170A and the network device 170B set UWB synchronization parameters 136.

In operations 222-230, the network devices 170 exchange the OOB synchronization parameters 134 and the UWB synchronization parameters 136 complete the ranging rounds. At operation 222, where the network device 170A generates a poll DTM. At operations 224A-224Z, the rest of the network devices 170B-170Z may provide respond DTMs to one another. At operation 228, a final DTM is transmitted by the network device 170A. The operational flow 200 ends at operation 230, where the network device 170B estimates its location in reference to any network devices 170 acting as anchors based at least in part upon the respond DTMs and the final DTM.

FIG. 3 shows an example of a data communication graph of a ranging round 300, in accordance with one or more embodiments. In one or more embodiments, the ranging round 300 shows removal of certain information from the variable MAC address portion of the payload on the poll DTM. For example, the removal of the information may save at least 53 bytes of data and improve a link budget of the poll DTM. In this example, the gain in power in this case is 1 dB, when using a frame that uses a Base Pulse Repetition Frequency (BPRF) first type of sequence packet (SP1) format sent at 6.8 Mbps.

In one or more embodiments, as a non-limiting example, the network devices 170 may receive information in the OOB synchronization parameters over the OOB channels. Then, the network devices 170 may push information to the UWB channels as part of the UWB synchronization parameters. In the example of FIG. 3, the ranging round 300 is a graph with linked network devices 170 shown (on the vertical axis) against two synchronization periods (one the horizontal axis). The linked network devices 170 of FIG. 3 comprise a tagged device, an initiator anchor, and three responder anchor.

In some embodiments, over an initial synchronization period, the initiator anchor transmits session setup operations in OOB communications. Further, the tagged device performs corresponding session set up operations. In response, the initiator anchor may provide anchor location round information that the tagged device may acknowledge the information (shown as communication block labeled "ACK"). At this point of the initial synchronization period, the initiator anchor and the responder anchors may communicate with UWB in-band communication to the tagged device (shown as communication block labeled "CMM"). The tagged device may determine its location via longer-range signaling and comprising lower band usage per synchronization period. As described above, the lower band usage per synchronization period may enable one or more additional responder anchors to communicate in the UWB in-band communications. In other embodiments, subsequent synchronization periods may comprise further reduced band usage.

FIG. 4 shows an example flowchart of a process 400 to delegate OOB management of a shared UWB clock (e.g., in ranging rounds), in accordance with one or more embodiments. Modifications, additions, or omissions may be made to the process 400. The process 400 may include more, fewer, or other operations than those shown below. For example, operations may be performed in parallel or in any suitable order. While at times discussed as the server 102 or the network devices 170, the server processor 106, the server controller 110, or components of any of thereof, any suitable system or components of the system 100 may perform one or more operations of the process 400. For example, one or more operations of the process 400 may be implemented, at least in part, in the form of software instructions 122 of FIG. 1, stored on a non-transitory computer readable medium, tangible, machine-readable media (e.g., server memory 120 of FIG. 1) that when run by one or more processors (e.g., one or more server processors 106 of FIG. 1) may cause the one or more processors to perform operations described in operations 402-428.

The process 400 starts at operation 402, where a tagged device (e.g., one of the network devices 170) establishes at least one OOB communication link between at least one anchor (e.g., another one of the network devices 170) and the tagged device. As described in reference to FIGS. 2 and 3, the OOB communication link may be triggered by an initiator anchor by one or more broadcasted signals. At operation 404, the tagged device may transmit UWB compatibility information of the device controller 176 to the at least one anchor. At operation 406, the tagged device may establish a first UWB communication link with a first anchor based at least in part upon the UWB compatibility information. At operation 408, the tagged device may establish a second UWB communication link with a second anchor based at least in part upon the UWB compatibility information. At operation 410, the tagged device may exchange OOB synchronization parameters 134 and UWB synchronization parameters 136 with the first anchor and the second anchor.

The process 400 continues at operation 420, where the tagged device may receive additional information relating to a ranging round procedure and determine whether there have been any updates to the OOB synchronization parameters 134 or the UWB synchronization parameters 136. If the tagged device determines that the ranging round information indicates changes to the OOB synchronization parameters 134 or the UWB synchronization parameters 136 (e.g., YES), the process 400 proceeds to operation 422. At operation 422, the tagged device maintains instructions 184 for the ranging round as previously exchanged in operation 410. If the tagged device determines that the ranging round information does not indicate changes to the OOB synchronization parameters 134 or the UWB synchronization parameters 136 (e.g., NO), the process 400 continues to operation 424. At operation 424, the tagged device may define new instructions 184 for the ranging rounds. For example, updated instructions may be needed if one or the respond anchors are removed from the predefined area 160A or at a first instance the tagged device enters the predefined area 160A. At operation 426, the tagged device updates the existing instructions 184 for the ranging round.

The process 400 ends at operation 428, where the tagged device performs subsequent ranging rounds in accordance with the instructions 184.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. A system, comprising:
a first tagged device comprising a first ultra-wideband (UWB) tag communicatively coupled with a first processor, the first processor being configured to:
  receive out-of-band (OOB) communication information from a first anchor of a plurality of anchors;
  request to establish a first OOB communication link with the first anchor based at least in part upon the OOB communication information;
  establish the first OOB communication link with the first anchor;
  in response to establishing the first OOB communication link, exchange a plurality of OOB synchronization parameters with the first anchor;
  transmit first UWB compatibility information to the first anchor, the first UWB compatibility information being representative of first communication capabilities associated with the first UWB tag;
  establish a first UWB communication link with the first anchor based at least in part upon the first UWB compatibility information;
  establish a second UWB communication link with a second anchor of the plurality of anchors based at least in part upon the first UWB compatibility information;
  exchange a first plurality of UWB synchronization parameters with the first anchor and the second anchor; and
  determine a first location of the first tagged device in a space based at least in part upon the first plurality of UWB synchronization parameters exchanged with the first anchor and the second anchor.

2. The system of claim 1, further comprising:
a second tagged device comprising a second UWB tag communicatively coupled with a second processor, the second processor being configured to:
  receive the OOB communication information from the first anchor;
  request to establish a second OOB communication link with the first anchor based at least in part upon the OOB communication information;
  establish the second OOB communication link with the first anchor;
  in response to establishing the second OOB communication link, exchange the plurality of OOB synchronization parameters with the first anchor;
  transmit second UWB compatibility information to the first anchor, the second UWB compatibility information being representative of second communication capabilities associated with the second UWB tag;
  establish a third UWB communication link with the first anchor based at least in part upon the second UWB compatibility information;
  establish a fourth UWB communication link with the second anchor based at least in part upon the second UWB compatibility information;
  exchange a second plurality of UWB synchronization parameters with the first anchor and the second anchor; and
  determine a second location of the second tagged device in the space based at least in part upon the second plurality of UWB synchronization parameters exchanged with the first anchor and the second anchor.

3. The system of claim 2, wherein:
the plurality of OOB synchronization parameters comprise timing of nodes in a synchronization group, rounding initiation, rounding updates, rounding end, anchor locations in the synchronization group, and a list of nearby anchors.

4. The system of claim 2, wherein:
the first plurality of UWB synchronization parameters comprise one or more first location measurements associated with the first tagged device; and
the second plurality of UWB synchronization parameters comprise one or more second location measurements associated with the second tagged device.

5. The system of claim 1, wherein:
exchanging the first plurality of UWB synchronization parameters with the first anchor and the second anchor comprises performing a ranging round.

6. The system of claim 1, wherein:
the first tagged device is a Machine Type Communication (MTC) device.

7. The system of claim 1, wherein:
the first plurality of UWB synchronization parameters comprise a plurality of key configuration parameters and a plurality of static configuration parameters that are maintained during a synchronization period.

8. A method performed by a tagged device comprising an ultra-wideband (UWB) tag, the method comprising:
receiving out-of-band (OOB) communication information from a first anchor of a plurality of anchors;
requesting to establish an OOB communication link with the first anchor based at least in part upon the OOB communication information;
establishing the OOB communication link with the first anchor;

in response to establishing the OOB communication link, exchanging a plurality of OOB synchronization parameters with the first anchor;

transmitting ultra-wideband (UWB) compatibility information to the first anchor, the UWB compatibility information being representative of communication capabilities associated with the UWB tag;

establishing a first UWB communication link with the first anchor based at least in part upon the UWB compatibility information;

establishing a second UWB communication link with a second anchor of the plurality of anchors based at least in part upon the UWB compatibility information;

exchanging a plurality of UWB synchronization parameters with the first anchor and the second anchor; and determining a first location of the tagged device in a space based at least in part upon the plurality of UWB synchronization parameters exchanged with the first anchor and the second anchor.

9. The method of claim 8, further comprising:

establishing a third UWB communication link with a third anchor based at least in part upon the UWB compatibility information;

establishing a fourth UWB communication link with a fourth anchor of the plurality of anchors based at least in part upon the UWB compatibility information;

exchanging the plurality of UWB synchronization parameters with the first anchor, the second anchor, the third anchor, and a fourth anchor; and determining a second location of the tagged device in a space based at least in part upon the plurality of UWB synchronization parameters exchanged with the first anchor, the second anchor, the third anchor, and a fourth anchor.

10. The method of claim 8, wherein:

the plurality of OOB synchronization parameters comprise timing of nodes in a synchronization group, rounding initiation, rounding updates, rounding end, anchor locations in the synchronization group, and a list of nearby anchors.

11. The method of claim 8, wherein:

the plurality of UWB synchronization parameters comprise one or more location measurements associated with the tagged device.

12. The method of claim 8, wherein:

exchanging the plurality of UWB synchronization parameters with the first anchor and the second anchor comprises performing a ranging round.

13. The method of claim 8, wherein:

the tagged device is a Machine Type Communication (MTC) device.

14. The method of claim 8, wherein:

the plurality of UWB synchronization parameters comprise a plurality of key configuration parameters and a plurality of static configuration parameters that are maintained during a synchronization period.

15. A non-transitory computer readable medium in a tagged device storing instructions that when executed by a processor cause the processor to:

receive out-of-band (OOB) communication information from a first anchor of a plurality of anchors;

request to establish an OOB communication link with the first anchor based at least in part upon the OOB communication information;

establish the OOB communication link with the first anchor;

in response to establishing the OOB communication link, exchange a plurality of OOB synchronization parameters with the first anchor;

transmit ultra-wideband (UWB) compatibility information to the first anchor, the UWB compatibility being representative of communication capabilities associated with a UWB tag of the tagged device;

establish a first UWB communication link with the first anchor based at least in part upon the UWB compatibility information;

establish a second UWB communication link with a second anchor of the plurality of anchors based at least in part upon the UWB compatibility information;

exchange a plurality of UWB synchronization parameters with the first anchor and the second anchor; and determine a first location of the tagged device in a space based at least in part upon the plurality of UWB synchronization parameters exchanged with the first anchor and the second anchor.

16. The non-transitory computer readable medium of claim 15, wherein:

the plurality of OOB synchronization parameters comprise timing of nodes in a synchronization group, rounding initiation, rounding updates, rounding end, anchor locations in the synchronization group, and a list of nearby anchors.

17. The non-transitory computer readable medium of claim 15, wherein:

the plurality of UWB synchronization parameters comprise one or more location measurements associated with the tagged device.

18. The non-transitory computer readable medium of claim 15, wherein:

exchanging the plurality of UWB synchronization parameters with the first anchor and the second anchor comprises performing a ranging round.

19. The non-transitory computer readable medium of claim 15, wherein:

the tagged device is a Machine Type Communication (MTC) device.

20. The non-transitory computer readable medium of claim 15, wherein:

the plurality of UWB synchronization parameters comprise a plurality of key configuration parameters and a plurality of static configuration parameters that are maintained during a synchronization period.

* * * * *